UNITED STATES PATENT OFFICE.

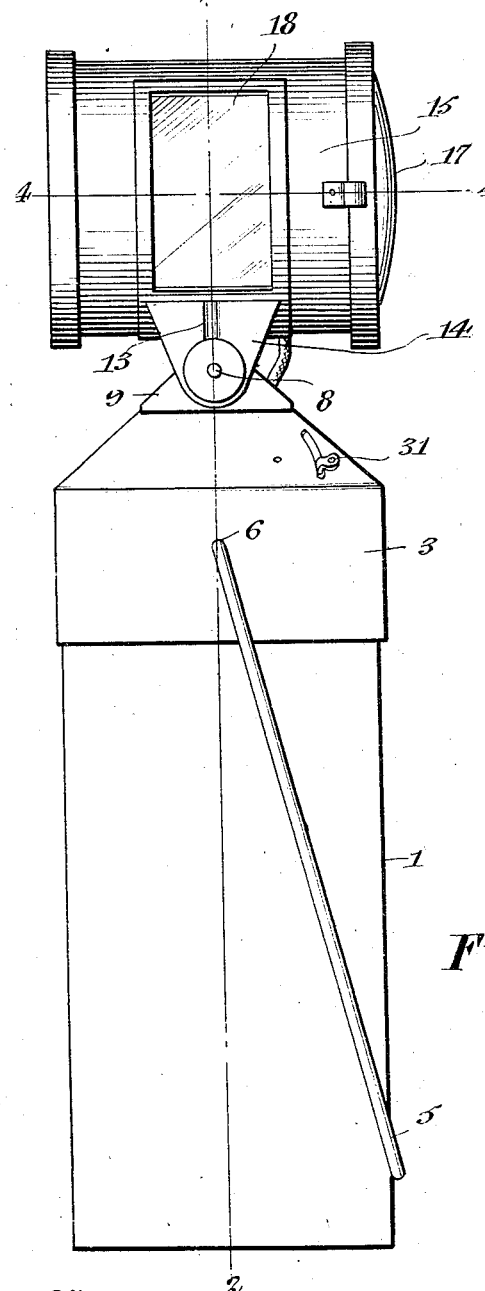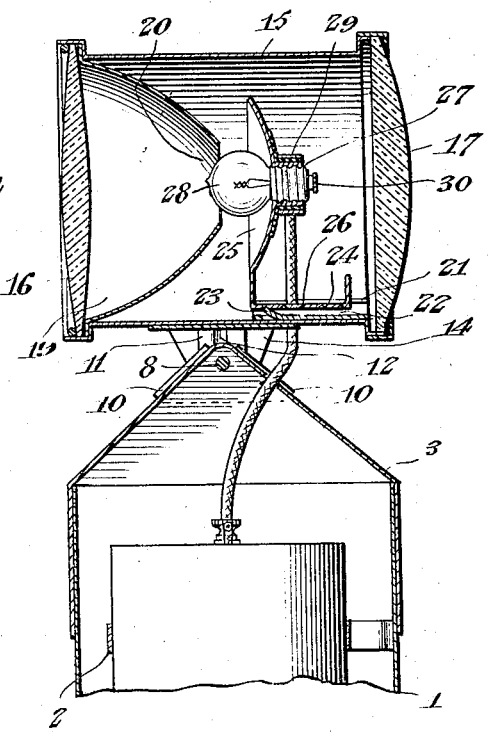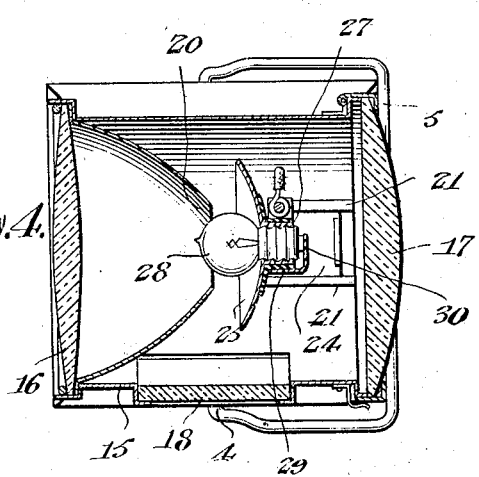

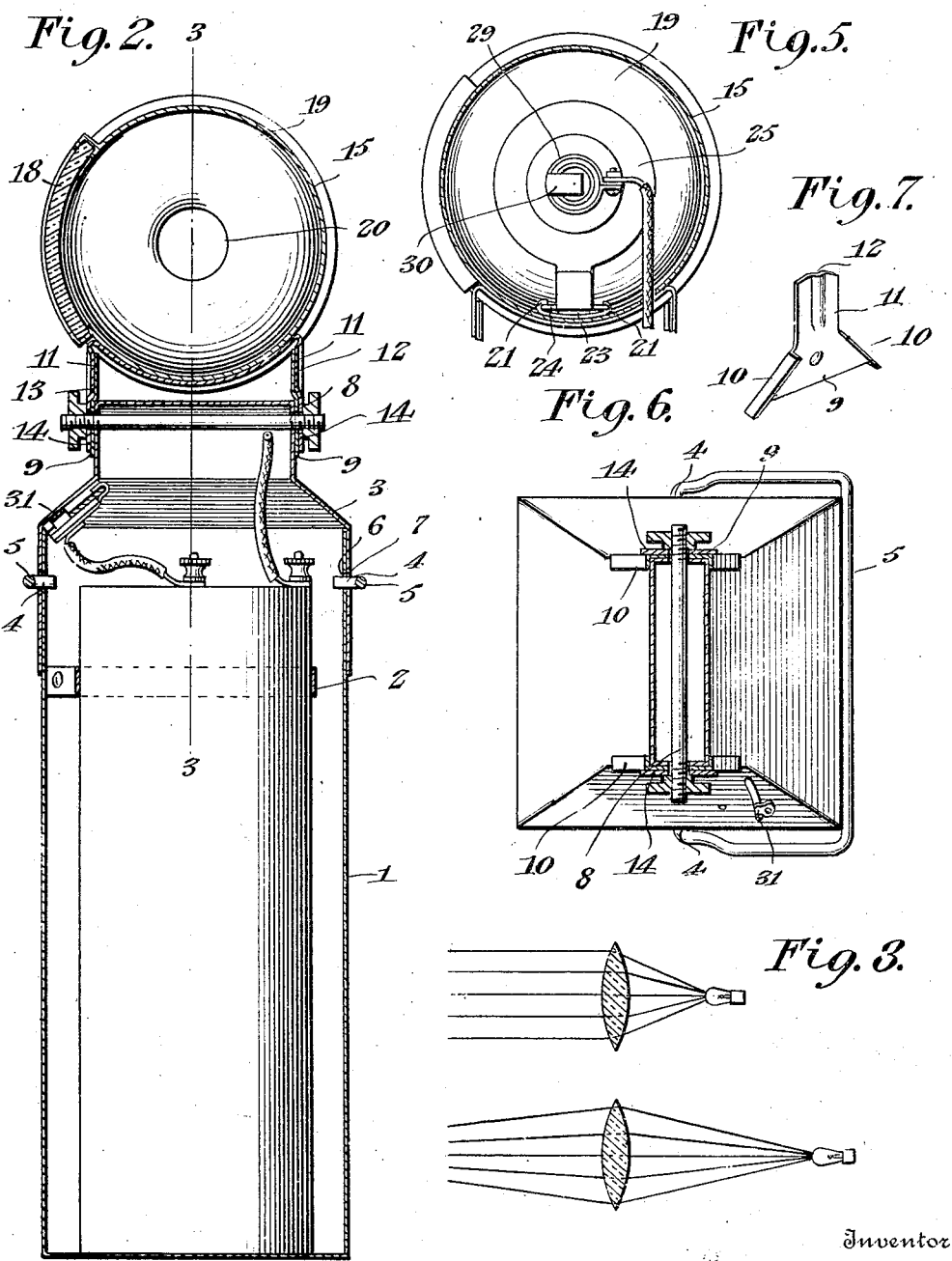

JOHN M. AUSTEN, OF SACRAMENTO, CALIFORNIA.

LAMP.

1,194,930.  Specification of Letters Patent. Patented Aug. 15, 1916.

Application filed March 10, 1916. Serial No. 83,422.

*To all whom it may concern:*

Be it known that I, JOHN M. AUSTEN, a citizen of the United States, residing at Sacramento, in the county of Sacramento and State of California, have invented new and useful Improvements in Lamps, of which the following is a specification.

This invention relates to portable lamps and more particularly to the electrical type and the invention has for its primary object to provide a portable lamp of suitable construction and including means whereby the convergent and divergent of the rays of light may be accurately regulated.

An object of the invention is the simple manner of mounting the second reflector for adjustment so that the rays from the illuminating means may strike the lens at the proper angle to be diverged or converged toward each other upon issuing from the lens.

Another object of the invention is to provide two lenses one of which is adjustable and supports the illuminating means so that the amount of light rays passing through the lens may be accurately regulated and also the amount of light rays passing through a second lens of different color.

A further object of the invention is the arrangement of the elements of the lamp proper so that the amount of rays passing to the front of the lamp in proportion to the amount of rays passing to the rear of the lamp proper may be accurately regulated.

With these and other objects in view the invention consists in the construction, combination and arrangement of parts as will be hereinafter more fully described, illustrated in the accompanying drawings and pointed out in the claims hereunto appended.

In the drawing: Figure 1 is a side elevation of the apparatus, Fig. 2 is a vertical sectional view on the line 2—2 of Fig. 1. Fig. 3 is a vertical sectional view on the line 3—3 of Fig. 2, Fig. 4 is a horizontal sectional view on the line 4—4 of Fig. 1. Fig. 5 is a sectional view taken through one side of the reflector. Fig. 6 is a sectional view through the support for the casing of the lamp proper. Fig. 7 is a perspective view of one of the flanges. Fig. 8 shows two diagrammatic views illustrating the direction of travel of the rays when the illuminating device is adjusted.

In the drawing the numeral 1 designates a receptacle of a size to support a dry cell and for holding the dry cell against vibratory movement I provide a clamp 2 of resilient material and so constructed as to engage two of the corners of the receptacle. This receptacle is provided with a cover 3 removably mounted upon the receptacle by means of the inturned ends 4 of a handle 5 engaging diametrically opposite openings 6 and 7 formed respectively in the receptacle and the cover. The top of the cover inclines upwardly and the uppermost portion thereof has passing therethrough a bolt 8. Mounted upon both ends of the bolt are clips 9, each having a pair of flanges 10 engaging opposite portions of the top of the cover and an upstanding extension 11 formed with a groove 12 receiving the rib 13 on the associated ear 14 formed upon the casing 15 of the lamp proper. At this point I wish to call attention to the fact that although I show two of the clips I wish it to be understood that one of the same can be dispensed with.

From the preceding description it will be seen that the lamp proper will be held in the proper position irrespective of the jolting to which the device is subjected. The casing 15 has mounted therein a front lens 16 and a rear colored lens 17 while the side of the casing has mounted therein a glass plate 18. The purpose of the lenses and glass plate is to allow the rays from the illuminating means to pass forwardly, laterally and rearwardly so as to be visible from the side, front and rear of the lamp. Snugly fitting the interior of the casing 15 and at a point adjacent the front lens 16 is a reflector 19 formed with a centrally arranged opening 20. The reflector 19 is of such a shape as to have its entire rear surface spaced from the adjacent interior surface of the casing so as to act in the capacity of a reflecting surface for the purpose hereinafter described. The casing has formed integral therewith or mounted thereupon in any suitable manner a pair of guides 21 and arranged between the guides is a tongue 22 having an angularly bent extremity 23. Slidably mounted within the guides is a plate 24 forming a portion of a second reflector 25, the latter being arranged in axial alinement with the heretofore mentioned reflector 19. The plate 24 is formed with a centrally arranged series of depressions 26 adapted to successively coöperate with the extremity 23 for holding the plate and with it the reflector in any of its adjusted positions. The reflector 25 at a central point has mounted therein a socket 27 adapted to receive any suitable illuminating means such as an electric bulb 28. The remaining terminal for the bulb 28 is formed by means of the band 29 encircling but insulated from the socket and provided with a contact 30 adapted to engage the central electrode of the bulb. For completing the invention I have provided a switch 31 mounted upon the cover of the receptacle and having a portion projecting beyond the latter so as to be manipulated by the finger of the operator. This switch is arranged in the circuit that runs from the battery to the bulb so that when in one position the bulb will be illuminated and when in another position it will be deënergized.

From the foregoing description it will be seen that I have provided a portable type of lamp that has a number of advantages such as allowing the parts to be readily cleaned and also to regulate the distance of the illuminating means from the lenses so as to vary the distribution of the light rays. This latter action is clearly set forth in the diagrammatic view of the drawing.

Another important feature of my invention is the manner of adjusting one reflector with relation to another reflector that is stationary so that more or less light rays will pass between the reflectors and be reflected by the surface of the stationary reflector toward the rear lens in an indirect manner.

From the foregoing description taken in connection with the accompanying drawing it should be apparent that I have provided a device which is admirably adapted for the purpose for which it is intended, that the device is simple, durable and efficient of construction and that the device may be manufactured and sold at a comparatively low cost.

Having described my invention what I claim is:

1. A lamp comprising a casing having guideways, a lens mounted in said casing, a reflector mounted behind said lens and provided with a centrally arranged opening, a second reflector slidably mounted in said guideways so as to move toward and away from said opening and illuminating means supported by said reflector in alinement with the opening in said reflector.

2. A lamp comprising a front lens, a glass plate mounted in one side of the casing, a reflector mounted in said casing adjacent said front lens and terminating midway of said glass plate and formed with a centrally arranged opening, a second reflector having a plate extension slidably mounted in said casing, illuminating means centrally arranged in said second reflector so as to move toward and away from the opening in said first reflector so as to vary the amount of light rays passing through said glass plate and means engaging depressions in said plate for adjustably holding said second reflector in its various positions.

In testimony whereof I affix my signature in presence of two witnesses.

JOHN M. AUSTEN.

Witnesses:
EDWIN DELOS CARPENTER,
CLARENCE L. BADER.